United States Patent [19]

Kunishio et al.

[11] 4,282,100
[45] Aug. 4, 1981

[54] APPARATUS FOR REFORMING FUEL OIL WHEREIN ULTRASONIC WAVES ARE UTILIZED

[75] Inventors: Misao Kunishio, Tokyo; Kenshi Shirai, Higashiyamato; Hiroyuki Takezi, Tachikawa, all of Japan

[73] Assignee: The Sanko Steamship Co., Ltd., Osaka, Japan

[21] Appl. No.: 72,860

[22] Filed: Sep. 5, 1979

[30] Foreign Application Priority Data

Sep. 18, 1978 [JP] Japan .................. 53-114102
Aug. 29, 1979 [JP] Japan .................. 54-109220

[51] Int. Cl.³ .................................. B01D 33/10
[52] U.S. Cl. .................................. 210/384; 210/402; 210/489
[58] Field of Search ............ 210/19, 77, 79, 349, 210/384, 388, 402, 489, 304, 313–315

[56] References Cited

U.S. PATENT DOCUMENTS

| 2,163,649 | 6/1939 | Weaver | 210/19 X |
| 2,420,652 | 5/1947 | Chilowsky | 210/388 X |
| 2,468,550 | 4/1949 | Fruth | 210/19 X |
| 2,963,158 | 12/1960 | Jung | 210/384 X |
| 3,305,481 | 2/1967 | Peterson | 210/384 X |
| 3,327,401 | 6/1967 | Stamos et al. | 210/384 X |
| 3,432,426 | 3/1969 | Megel | 210/19 X |
| 3,478,883 | 11/1969 | Deluca, Jr. | 210/388 X |
| 3,489,679 | 1/1970 | Davidson et al. | 210/384 X |
| 3,490,584 | 1/1970 | Balamuth | 210/19 X |

FOREIGN PATENT DOCUMENTS

| 2414785 | 10/1974 | Fed. Rep. of Germany | 210/384 |
| 2427053 | 1/1975 | Fed. Rep. of Germany | 210/384 |
| 46-43759 | 12/1971 | Japan . | |
| 49-109270 | 9/1974 | Japan . | |
| 651829 | 3/1979 | U.S.S.R. | 210/384 |

OTHER PUBLICATIONS

Nikkei Mechanical, Apr. 2, 1979, pp. 110–113.

*Primary Examiner*—Robert H. Spitzer
*Attorney, Agent, or Firm*—Ladas & Parry

[57] ABSTRACT

An apparatus for reforming fuel oil wherein ultrasonic waves are utilized. The apparatus comprises a closed vessel, a rotary collector formed in a cylindrical shape, an inlet conduit for supplying fuel oil to be reformed into the vessel, an outlet conduit for delivering reformed oil from the vessel, and a ultrasonic irradiating device. The rotary collector has a layered mesh structure of a fine mesh, preferably of mesh size between 2 $\mu$m and 20 $\mu$m, mounted thereon so that sludge contained in the fuel oil to be reformed is collected on the layered mesh structure. One end of a horn connected to the ultrasonic wave irradiating device faces the layered mesh structure forming a small gap therebetween so that the sludge collected on the layered mesh structure is dissociated by the ultrasonic waves.

11 Claims, 5 Drawing Figures

APPARATUS FOR REFORMING FUEL OIL WHEREIN ULTRASONIC WAVES ARE UTILIZED

TECHNICAL FIELD TO WHICH THE INVENTION RELATES

The present invention relates to an apparatus for reforming fuel oil, more specifically an apparatus for reforming fuel oil wherein ultrasonic waves are utilized so that the combustibility of the fuel oil is increased.

Due to the recent shortage of petroleum, the quality of fuel oil which is available for internal combustion engines, especially diesel engines of a large size, such as a marine engine, may be degraded in the near future. To overcome the degradation of fuel oil, some internal combustion engine manufacturers are trying to improve the performance of their engines in the usage of lower grade fuel oil. However, it is very difficult to overcome the degradation of fuel oil by only such an improvement. On the other hand, there are some possibilities of overcoming the degradation of fuel oil if fuel oil is reformed by a specially designed treatment systems, so that a diesel engine can burn such degraded fuel oil without combustion trouble.

BACKGROUND ART OF THE INVENTION

To increase the combustibility and the ignition ability of an internal combustion engine, it is necessary to remove from the fuel oil heavy, oxidized deteriorating oily products deposits comprising high molecular hydrocarbons which contain impurities, such as asphaltene; such deteriorating products will be referred to hereinafter as sludge.

Conventionally the fuel oil for use, for example, in a marine engine is subjected to one or more of the following methods on the ship so that the sludge is removed.

(a) A method wherein a sedimentation tank is used.

(b) A method wherein a centrifugal separator is used.

(c) A method wherein a filter having a mesh size of between 45 $\mu$m and 75 $\mu$m is used.

It is well known that, as the grade of the fuel oil is lowered, the sludge content in the fuel oil is considerably increased and its specific gravity is also increased. However, there is not an obvious difference in specific gravity between the sludge and the degraded fuel oil, because the sludge essentially comprises hydrocarbons and comparatively small amounts of ash content. It is therefore difficult to remove the sludge contained in the degraded fuel oil in accordance with the above-mentioned methods (a) or (b) wherein the difference in the specific gravity is utilized. When the method (c) is carried out for removing sludge contained in the degraded fuel oil, the mesh size applied in a conventional filter is too large. More specifically, the mesh size of a filter utilized in the above-mentioned conventional method (c) is larger than 45 $\mu$m, and, as a result, only particles larger than 45 $\mu$m in diameter are strained out by means of the filter. It has been said, however, that it is preferable for increasing the combustibility of an internal combustion engine to strain out sludge contained in fuel oil, the particle size of which sludge is between 5 $\mu$m and 30 $\mu$m. As is apparent from the above description, the above-mentioned method (c) is not satisfactory for increasing the combustibility of an internal combustion engine. To strain out sludge, the particle size of which is between 5 $\mu$m and 30 $\mu$m, it is necessary to use a fine mesh filter for fuel oil utilized in a marine engine. In such a case, a sufficient filtering capacity cannot be obtained even though the pressure difference exerted on the filter is increased, because the filtrate has a large surface tension whereby making the rate of filtration very slow through such a small mesh filter and also the filter may become clogged in a short period. As a result, it is necessary to have a large filtering surface, and therefore, the conventional apparatus wherein the method (c) is carried out is large in size and high in cost.

It will be understood from the description above that it becomes more difficult to remove the sludge when the above-mentioned methods (a) through (c) are carried out, as the fuel oil is degraded and as the sludge content is increased. As a result, the sludge, which is difficult to burn in a diesel combustion chamber as it is, causes incomplete combustion, and carbon adheres to the injection nozzles of the diesel engine as carbon flower when fuel oil with sludge suspended in it is fed to the engine. The carbon flower prevents the atomization of the fuel oil, and in addition, when carbon adheres between a valve and the corresponding valve seat or between a piston ring and the corresponding cylinder liner, it may be become a main cause of wearing and acid corrosion of the valve, valve seat, ring and liner. The sludge which is contained in fuel oil results in instable performance of the diesel engine when in operation, particularly in middle and high speed diesel engines.

By a conventionally known filtering system wherein ultrasonic means are utilized fuel oil can be somewhat reformed, however, the efficiency for irradiating ultrasonic waves is not high because, in the conventional system, ultrasonic waves are irradiated within the whole container wherein fuel oil is stored. As a result, the strainer utilized in the conventional method is clogged by sludge in a very short time, and it is necessary to discontinue reforming the fuel oil. In addition, the conventional method wherein ultrasonic waves are utilized has a disadvantage in that the amplitude is too small, and therefore, cleaning of the strainer cannot be effected sufficiently. Based on the tests conducted by the present inventors, it was confirmed that the cleaning operation of the filter medium was achieved by exerting suction on the particles caked on the filter by utilizing a vacuum pressure generated within a gap which is smaller than several millimeters and which is formed between the end of a tapered horn and the surface of the layered mesh structure. To realize the suction effect due to the vacuum pressure, an amplitude in a range higher than 20 $\mu$m from peak to peak is required. However, in the conventional method wherein ultrasonic waves are utilized, the amplitude was extraordinarily small, i.e., about several $\mu$m from peak to peak. Accordingly, except for the particular case wherein the condensation of sludge which cause clogging of the filter medium is low, the conventionally known method wherein liquid is continuously filtered while the filter medium is being cleaned by utilizing ultrasonic waves has been unsatisfactory. However, the condensation of the sludge contained in the fuel oil which is to be treated by means of an apparatus of the present invention is too high to remove in accordance with the conventionally known method wherein the fuel oil is filtered while ultrasonic waves are utilized.

SUMMARY OF THE INVENTION

An object of the present invention is to provide an apparatus for reforming fuel oil which apparatus is small in size, and economic and easy to operate and maintain.

Another object of the present invention is to provide an apparatus for reforming fuel oil by which filtered and reformed oil can be obtained, which oil does not substantially contain sludge which may result in circumstantial pollution.

According to the present invention, the above-mentioned objects of the present invention are achieved by an apparatus for reforming fuel oil wherein ultrasonic waves are utilized. The apparatus comprises a closed vessel means and a rotary collector means. The rotary collector means has a layered mesh structure mounted thereon for collecting sludge contained in the fuel oil in a suspended state. The rotary collector means encircles an axis and is disposed within the vessel means rotatably about the axis so that the vessel means is partitioned into inlet and outlet chambers. Inlet and outlet conduits are connected to the inlet and outlet chambers, respectively, for supplying the fuel oil and for delivering the reformed fuel oil, respectively. The reforming apparatus further comprises a means for generating ultrasonic waves. The ultrasonic wave generating means is provided with a device or horn for irradiating the ultrasonic waves. The end of the ultrasonic irradiating device is in the inlet chamber and in a position adjacent to the layered mesh structure mounted on the rotary collector means so that a small gap, i.e., of several millimeters, is formed between the end of the device or horn and the outer layer surface of the layered mesh structure, which gap is sometimes also referred to as an ultrasonic dispersing zone in this specification. The sludge caught on the layered mesh structure is conveyed to the small gap or the ultrasonic discharging zone as the rotary collector means rotates, and said sludge is dissociated into small particles and reformed not only at the end of the ultrasonic wave irradiating device or horn but also on the surface of the layered mesh structure facing the end of the device or horn by means of the ultrasonic waves irradiated from the device or horn. Please note that the ultrasonic dispersion of the present invention is substantially caused not by the cavitation in the liquid but by the cavitation on the surfaces of the solid bodies, i.e., the horn and the rotary collector means. The rotary collector means continuously collects the sludge thereon and conveys to the sludge the ultrasonic dispersing zone as it is collected.

It is preferable that the rotary collector means be of a cylindrical shape. It is also preferable that the layered mesh structure mounted on the rotary collector means has a fine mesh, desirably of between 2 $\mu$m and 20 $\mu$m, so that particles having a diameter between 5 $\mu$m and 30 $\mu$m can be strained out. It is desirable that the rotary collector means has a three layered mesh structure, as will be explained with reference to the illustrated embodiment of the present invention.

It is also preferable that the ultrasonic wave irradiating device or horn is so arranged that an elongated gap extending in a direction perpendicular to that of the movement of the layered mesh structure is formed between the end of the ultrasonic wave irradiating device and the layered mesh structure.

In the apparatus of the present invention, sludge contained in fuel oil is caught on the layered mesh structure mounted on the rotary collector means and is subjected to ultrasonic waves irradiated from the ultrasonic horn. As a result, the sludge is dissociated into particles, the size of which is smaller than the mesh size of the layered mesh structure, so that the dissociated particles can pass through the mesh of the layered mesh structure. At the same time, clogging of the layered mesh structure is prevented by the dispersing and cleaning operation of the ultrasonic waves.

In the present invention, the above dispersing and cleaning operations are effected in a narrow space between the end of the ultrasonic irradiating device and the layered mesh structure, and, as will be explained later, the distance of the narrow space affects the operations, especially the dissociating and cleaning operation.

It is preferable that the frequency of the ultrasonic waves is between 15 KHz and 30 KHz so that the effects of the ultrasonic waves can effectively be achieved. In the preferred embodiment of the present invention, the frequency of the ultrasonic waves is 19 KHz. This is because noises caused by the ultrasonic waves can be minimized since the frequency exceeds the audibility threshold and because it is easy to manufacture a powerful vibrator having a resonant frequency of 19 KHz with a size satisfactory for installation.

The amplitude of the ultrasonic wave irradiating device should be selected to be as large as possible in order to reform the degraded fuel oil while avoiding excessive cavitation against the device. In the preferred embodiment of the present invention, the amplitude of the device selected is between 25 $\mu$m and 30 $\mu$m from peak to peak. The amplitude can be maintained constant regardless of the amount of the load, and the frequency can be automatically tuned at its resonance.

BRIEF DESCRIPTION OF THE DRAWINGS

A preferred embodiment of the present invention will now be explained in detail with reference to the attached drawings, wherein.

DETAILED DESCRIPTION OF THE INVENTION

Figure 1:
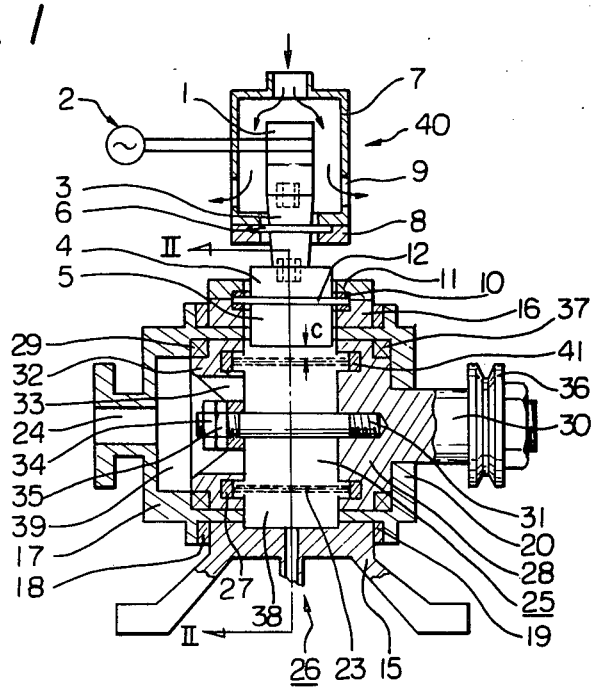
FIG. 1 is a cross sectional elevational view of an apparatus according to the present invention.

Referring to FIG. 1, a transducer 1 of a Langevin type is energized by an ultrasonic wave generator 2. In the transducer 1 an element of PZT ceramics, i.e., a solid solution of lead zirconate ($PbZrO_3$) and lead titanate ($PbTiO_3$), is sandwiched by a pair of metallic plates and is bound together by bolts. The transducer 1 is screw threaded to a cone 3 which has a half wave resonant length and which is screw threaded to a wedge shaped horn 4 also having a half wave resonant length. The amplitude of the transducer 1 is amplified by the cone 3 and the horn 4 so that the amplitude at the front end 5 of the horn 4 is between 25 $\mu$m and 30 $\mu$m from peak to peak.

The horn 4 has a wedge shape so that vibrating energy can be concentrated on a layered mesh structure 23 of a rotary collector 25, which will be explained hereinbelow. In the present embodiment, the resonant frequency of the horn 4 is 19.15 KHz, and the horn 4 is made of steel in a length of 140 mm and a size of 90 mm×10 mm at the front end thereof.

The fuel oil to be reformed is usually heated to a temperature between 100° C. and 120° C. so that the viscosity thereof is lowered and so that it can easily pass through the layered mesh structure, which temperature is higher than the maximum allowable temperature for the transducer, i.e., about 60° C. Accordingly, the transducer 1 is cooled by dry air supplied from above from an air source prepared in a separate means (not shown) through a housing 7. The housing 7 is connected to a node flange 6 disposed on an vibrating node of the cone 3. The housing 7 has a plurality of holes 9 for exhausting cool air. A disc 8 is utilized to fix the node flange 6 to the housing 7.

A flange 12 of a square shape is disposed on the vibrating node of the horn 4 and is sandwiched by a pair of gaskets 10, and then is threaded to a seat 16 of a main body 15 by means of a pressing plate 11. As a result, an ultrasonic transducer system 40 provided with the horn 4 is secured tightly to the main body 15 so that liquid is prevented from entering or escaping. (Hereinafter this situation will be termed "liquid-tight", based upon the term "airtight" used in corresponding situations involving air.)

A side cover 17 having an outlet conduit 24 for delivering reformed fuel oil is secured in a liquid-tight manner to the left side of the main body 15 via a gasket 18 so that an outlet chamber is formed. A cover 20 is also secured in a liquid-tight manner to the right side of the main body 15 via a gasket 19. Thus the main body 15 with the side cover 17 and the cover 20 constitutes a closed vessel structure, except for a passage in an outlet conduit 24 and a passage in an inlet conduit 22 (see FIG. 2), which closed vessel structure will be referred to as a vessel means 26 hereinafter and in which a rotary collector 25 is installed, as will be explained later.

The rotary collector 25 has a hollow cylindrical structure formed by layered meshes. The meshes comprise three layers, i.e., an outer layer mesh, an intermediate mesh layer and an inner layer mesh. The outer layer is durable enough against the impact sound pressure which occurs in ultrasonic dissociation, as that it maintains the ultrasonic dissociation at an effective level while damping the impact sound pressure, and therefore, damage to the intermediate layer due to cavitation is prevented. The intermediate layer is a layered mesh structure 23, the mesh size of which is decided based on the maximum size of sludge particles being permitted to pass therethrough, taking combustibility into consideration. The intermediate layer is reinforced by one or more rigid meshes which are attached thereto from one side or both sides. The inner layer supports an external force which is exerted on the outer layer and the intermediate layer due to the pressure difference.

In the illustrated embodiment, the outer layer is formed by a triple lamination structure made of 60 mesh stainless steel net. The intermediate layer has a triple lamination structure comprising a 1500 mesh stainless steel net which can pass particles between 5 μm and 10 μm, and 100 mesh stainless steel nets sandwiching the 1500 mesh stainless steel on each side. The inner layer is composed of a double structure which consists of a plain Dutch weave of a stainless steel. In the present embodiment, a reinforcing spring is arranged within the rotary collector 25. The layered and laminated mesh structures are formed in one body by means of diffusion bonding, and then, the seams are welded so that a three layered mesh structure having a cylindrical shape, with an outer diameter of 70 mm and a length of 200 mm is formed. Note that the layered mesh structure is so designed that the layered mesh structure can satisfy the following requirements.

(a) The layered mesh structure is durable against cavitation erosion caused by the irradiated ultrasonic waves.

(b) The thickness of the layered mesh structure is thin enough so that ultrasonic waves are utilized effectively.

(c) The layered mesh structure is heat resistant because it is used when the fuel oil is heated.

(d) The layered mesh structure is of a sufficient strength so that it can resist differential pressure.

One end of the layered mesh structure 23 is inserted onto a left side plate 32 via a gasket 27, and the other end of the layered mesh structure 23 is inserted onto a right side plate 28 via a gasket 41. The rotary collector means 25 is tightly and integrally held in a liquid-tight manner by means of the left and right side plates 32 and 28 connected by a stud bolt 31, positioned at the central axis, a nut 35 and a lock nut 34. The integral body thus obtained will also be referred to as a rotary collector means 25 hereinbelow. A drive shaft 30 projecting from the center of the right side plate 28 is provided with a pulley 36 so that it is driven from an external power source (not shown). The left side plate 32 has a plurality of holes 33 for discharging the fuel oil filtered by the rotary collector means 25.

The left side plate 32 of the rotary collector means 25 is rotatably supported in a liquid-tight manner on the side cover 17, which has an outlet conduit 24 for delivering the reformed fuel oil, via an oil seal 29. The right side plate 28 of the rotary collector means 25 is also rotatably supported in a liquid-tight manner on the cover 20 via a seal 37. Accordingly, the rotary collector means 25 is as one body rotatably supported in a liquid-tight manner within the vessel means 26 and the space within the vessel means 26 is partitioned into an inlet chamber 38 and an outlet chamber 39 by the rotary collector means 25.

The horn 4 is disposed within the inlet chamber 38, wherein the fuel oil contains a lot of sludge, and the horn 4 is so arranged that the front end thereof faces the layered mesh structure 23 of the rotary collector means 25 forming a predetermined gap C therebetween extending in an axial direction. It is preferable that the gap C, which is called an ultrasonic dispersing zone, is equal to or smaller than 3 mm. Due to the cavitation generated within the ultrasonic dispersing zone C thus obtained, sludge which cannot pass through the intermediate layer or layered mesh structure 23 is dispersed into minute particles on the surface of the outer layer and the front end 5 of the horn 4. At the same time, due to the vacuum generated by the cavitation, a linear stream from the inner side to the outer side through the intermediate layer is generated, and therefore, clogging of the intermediate layer or layered mesh structure 23 is prevented. In addition, the present invention has an auxiliary advantage in that ultrasonic waves, the impact of which is absorbed in the outer layer, vibrate the intermediate layer, and accordingly fuel oil can pass smoothly through the same.

Figure 2:
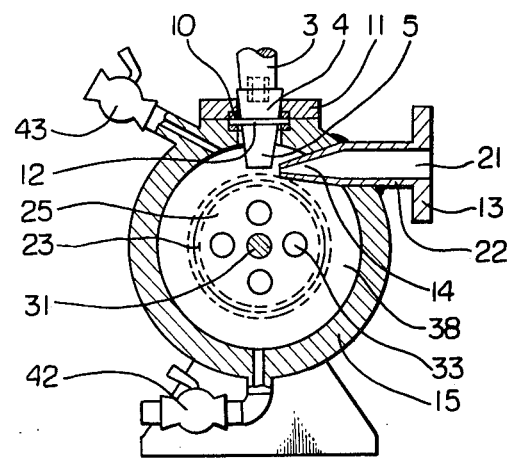
FIG. 2 is a view taken along line II—II in FIG. 1.

FIG. 2 illustrates a cross sectional view taken along line II—II in FIG. 1. In FIG. 2, an inlet conduit 22 provided with a flange at one end thereof and having a passage 21 for supplying fuel oil is welded to the main body 15. The inlet conduit 22 has a nozzle 14 of a rectangular shape integrated thereto which opens to a space adjacent to the front end 5 of the horn 4 within the main body 15, so that fuel oil is supplied through the passage 21 in the inlet conduit 22 to the gap or ultrasonic dispersing zone between the front end 5 of the horn 4 and the layered mesh structure 23 mounted on the rotary collector 25. An air cock 43 is disposed on the main body 15, and a drain cock 42 for exhausting liquid stored within the vessel means 26 is also disposed on the main body 15.

In a conventional apparatus wherein a filtering method is carried out, a backwash system, wherein a filtrate is caused to flow in reverse, is generally utilized to recover the filtering ability of the filter medium when the filter medium is clogged, so that sludge which is clogging the filter medium is cleaned out because it is considered to be harmful for combustion. However, it should be noted that, although it is difficult to burn the sludge as it is, it is possible to burn it when its combustibility is increased. In the present invention, it is dispersed into fine particles by means of ultrasonic waves so that its combustibility is increased. As a result, it is possible to minimize the loss of the fuel oil, and at the same time it is possible to omit installation of a device for treating fuel wastes, because fuel wastes are not generated in the present invention. It is a remarkable advantage for preventing environmental pollution.

As will be apparent from the above description, the present invention does not require any backwash equipment. In addition, since, in the apparatus of the present invention, almost no particles become caked on the rotary collector and since the layered mesh structure is so arranged that it is not damaged by cavitation due to ultrasonic waves, the apparatus can be utilized for a long period without cleaning and maintainance operations.

In the design of the above construction, the temperature, the humidity and the oscillation are so selected that they satisfy the requirements for equipment used on a ship. However, the design technique will be obvious for a person skilled in the art, and therefore, its detailed explanation is omitted here.

The operation characteristics of the above-explained apparatus for reforming fuel oil wherein ultrasonic waves are utilized are explained hereinbelow. Characteristics of the system, besides those relating to ultrasonic waves, are the following factors, which mainly influence the efficiency of the apparatus of the present invention, i.e., the inlet pressure of the fuel oil, the temperature, the viscosity, the sludge containing ratio, the peripheral speed of the rotary collector, and the gap of the ultrasonic dispersing zone.

Figure 3:
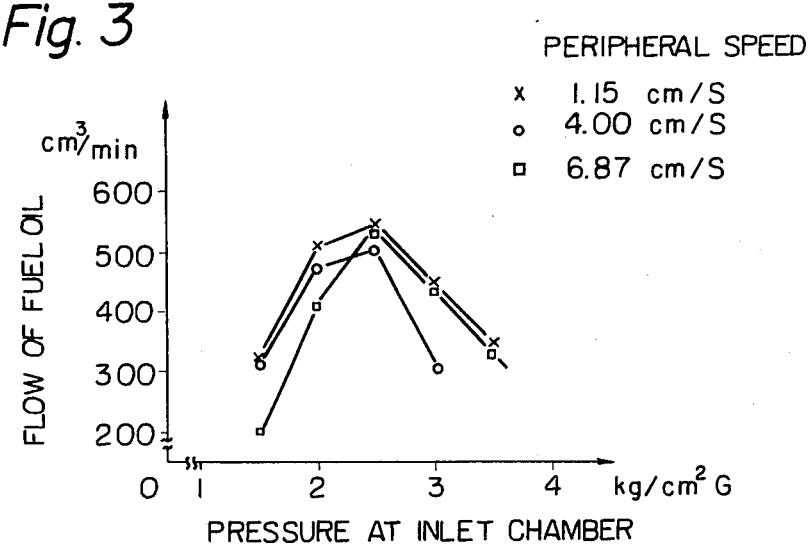
FIG. 3 is a diagram which illustrates a relationship between the flow and pressure characteristics of the fuel oil reforming apparatus according to the present invention.

Data regarding the relationship between the flow of fuel oil and the pressure in the inlet chamber are illustrated in FIG. 3. The data illustrated in FIG. 3 were obtained under the conditions wherein the fuel oil having a viscosity of RW (No.1) 1500 sec was heated at a temperature of 70° C., the mesh size of the intermediate layer used was 10 μm, the dimension of the front end of the horn was 56 mm×22 mm, and the frequency of the ultrasonic waves was 19 KHz. The maximum output of the ultrasonic waves was about 800 watt. You will note from FIG. 3 that there was an optimum pressure, i.e., about 2.5 kg/cm$^2$ G, in the inlet chamber wherein the flow of the fuel oil was maximum. On the other hand, considerable changes in the flow of the fuel oil were not observed when the peripheral speed of the rotary collector was varied. The inventors of the present invention confirmed that the characteristics explained above were generally observed in fuel oils used in the apparatus of the present invention. It should be noted that the optimum pressure in the inlet chamber was distributed between 2.5 kg/cm$^2$ G and 3.5 kg/cm$^2$ G, depending on the kind of fuel oil and the temperature.

Figure 4:
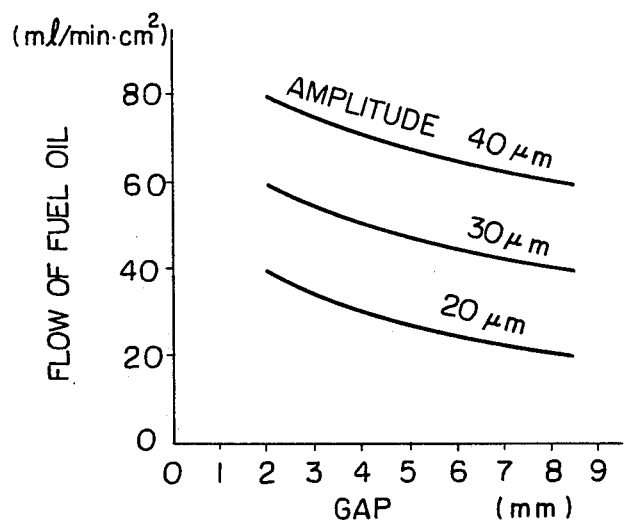
FIG. 4 is a diagram which illustrates the relationship between the flow and the distance formed between the end of the ultrasonic wave irradiating device and the layered mesh structure.

FIG. 4 is a diagram wherein the relationship between the flow of the fuel oil to be reformed and the gap between the front end of the horn and the layered mesh structure is illustrated by changing the amplitude of the horn. As the amplitude is increased, the flow of fuel oil to be reformed can be increased, because the cavitation effect of the ultrasonic wave is increased. However, it should be noted that the force whereby the layered mesh structure may be damaged is also increased as the amplitude is increased. As a result, the amplitude of the horn cannot be increased excessively. It was confirmed that the conditions wherein the amplitude of the horn was 30 μm, the gap was 3 mm, and the flow of fuel oil to be reformed was about 55 ml/min.cm$^2$ were preferable.

Figure 5:
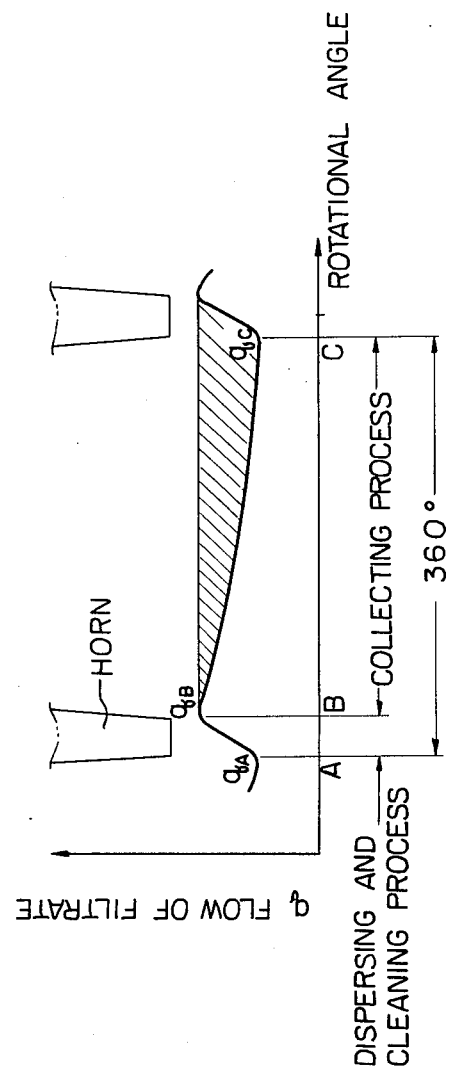
FIG. 5 is an explanatory view wherein the flow in the apparatus according to the present invention is explained.

The reforming mechanism of the present invention will now be explained with reference to FIG. 5 wherein the flow of the filtrate is plotted on the ordinate, and the rotational angle of the rotary collector means is plotted on the abscissa. When a certain point of collecting on the layered mesh structure is reached, it will be apparent that the filtering operation of the present invention comprises a repeat operation of a dispersing and cleaning process and of a collecting process. When a small area is formed on the surface of the layered mesh structure, the width of which area in an axial direction is equal to that of the horn and the length of which in a peripheral direction is very small, the change of the flow of the filtrate passing through the small area in accordance with the change in the rotational angle is illustrated by a curve passing through points $q_A$, $q_B$ and $q_C$. The region wherein the flow is increased due to the ultrasonic waves from $q_A$ to $q_B$ is the dispersing and cleaning process, and the region wherein the flow is decreased from $q_B$ to $q_C$ is the collecting process. The average flow per one revolution is designated by an area surrounded by the curve $q_A$ $q_B$ $q_C$, and lines $Aq_A$, $Cq_C$ and AC.

To obviate the continuous collecting operation and to effect the continuous filtering operation, it is necessary that the following requirement is satisfied:

$$q_C \geq q_A$$

wherein $q_A$ is a minimum value determined by the dispersing and cleaning ability. In other words, the change in flow during the collecting process must be within the area with hatching lines in FIG. 5, when $q_C$ is equal to $q_A$.

In a conventional actually used homogenizer utilizing ultrasonic waves, no layered mesh structure had been installed and fuel oil having sludge suspended therein had been subjected to the reforming operation, so that effective performance of reforming fuel oil had not been obtained. On the other hand, according to the present invention, the sludge, which has been temporarily separated by means of the layered mesh structure, is subjected to the reforming operation, and is dissociated into minute particles; therefore, the ultrasonic waves are efficiently utilized, and almost no particles are caked on the layered mesh structure, and the flow of fuel to be reformed can be large. As a result, the amount of fuel to be reformed at a certain input is remarkably increased. Please note that in the present invention the flow supplied from the inlet conduit is substantially the same as that delivered from the outlet conduit.

In an embodiment of the present invention, which has a construction substantially the same as that illustrated in data in FIG. 3, except that the horn has a width of 90 mm and a thickness of 10 mm, i.e., a more slender rectangular shape, the flow was 1.5 l/min through the layered mesh structure, the mesh size of which was 10 $\mu$m. Naturally, the flow may be varied in accordance with changes in the kind of fuel oil.

The comparison between the reformed fuel oil obtained by using irradiating ultrasonic waves in an apparatus of the present invention and the degraded fuel oil before it is submitted to such an operation is described in the Table. As is apparent from the Table, a remarkable difference of the viscosity and asphaltene between the degraded fuel oil and the reformed fuel oil was recognized, therefore showing that the method of the present invention is superior.

In a combustion test wherein the fuel oil, reformed in accordance with the present invention, was used in a diesel engine, the after burning period was shorter than the non-reformed fuel oil and the combustion pressure shape was more stable. In addition, the ignition delay was improved. As a result, it was confirmed that the temperature of the exhaust gas and the revolution speed of the engine were stable. From the above facts, it is obvious that the sludge, which causes incomplete combustion in engines, is dissociated into small combustible particles, and consequently the inventors of the present invention confirmed that the fuel oil was reformed.

When an appratus according to the present invention was installed on an actual ship and was connected to a diesel engine for driving a generator wherein heavy fuel oil of Redwood (No. 1) 1500 sec was utilized, the operation of the engine over a long period was as stable as that of a conventional diesel engine wherein marine diesel oil was utilized. Through a periodic inspection effected after 3000 hours of operation, it was observed that the degree of adhesion of carbons to the cylinder head, to the fuel injection valves and to the exhaust ports and the wear rate of the liners and the piston rings were almost the same as those in a conventional engine wherein marine diesel oil was utilized.

Therefore, there are great advantages and profits to be derived from the present invention for reforming fuel oil, as this invention is small in size economical and easy to maintain.

TABLE

| | Before Reforming | After Reforming |
|---|---|---|
| Specific Gravity | 0.9657 | 0.9643 |
| Viscosity | | |
| CSt (at 50° C.) | 210.0 | 192.4 |
| RW sec#1 (at 100° F.) | 1910 | 1790 |
| Sulfer (weight %) | 1.96 | 1.99 |
| Pour point (°C.) | −12.5 | −12.5 |
| Carbon residue (weight %) | 7.39 | 6.90 |
| Ash (weight %) | 0.05 | 0.06 |
| Moisture (weight %) | less than 0.05 | less than 0.05 |
| Flash point (°C.) | 110 | 110 |
| Dry sludge (weight %) | 0.003 | 0.001 |
| | (1.1 min/g) | (1.6 min/g) |
| Asphaltene (weight %) | 4.87 | — |
| Xylene equivalent weight | 27 | 27 |

What we claim is:

1. An apparatus for reforming fuel oil wherein ultrasonic waves are utilized and which comprises:
   a closed vessel means;
   a rotary collector means, shaped in a cylindrical form and having a layered mesh structure mounted on the cylindrical surface thereof for continuously collecting sludge contained in said fuel oil, which means is encircling an axis and is disposed rotatably about said axis within said vessel means so that said vessel means is partitioned into inlet and outlet chambers;
   an inlet conduit, connected to said inlet chamber, for supplying fuel oil to be reformed to said vessel means;
   an outlet conduit, connected to said outlet chamber, for delivering reformed fuel oil; and
   a means for generating ultrasonic waves provided with a device for irradiating said ultrasonic waves, the end of which device is positioned adjacent to said layered mesh structure mounted on said rotary collector means so that said sludge collected on said cylindrical surface of said layered mesh structure is dissociated into particles by means of said ultrasonic waves being irradiated from said device.

2. An apparatus for reforming fuel oil according to claim 1, wherein the mesh size of said layered mesh structure is between 2 $\mu$m and 20 $\mu$m.

3. An apparatus for reforming fuel oil according to claim 1, wherein said ultrasonic wave irradiating device is disposed within said inlet chamber of said vessel means, and said end of said device faces the surface of said layered mesh structure facing said inlet chamber.

4. An apparatus for reforming fuel oil according to claim 1, wherein said ultrasonic wave irradiating device is so arranged that an elongated gap extending in a direction perpendicular to that of the movement of said layered mesh structure is formed between said end of said ultrasonic wave irradiating device and said layered mesh structure.

5. An apparatus for reforming fuel oil according to claim 1, wherein the frequency of said ultrasonic waves generated by said ultrasonic wave generating means is between 15 KHz and 30 KHz.

6. An apparatus for reforming fuel oil wherein ultrasonic waves are utilized and which comprises:
   a closed vessel means having a substantially cylindrical shape;
   a rotary collector means, having a cylindrical shape and a layered mesh structure of a fine mesh size mounted on a cylindrical surface thereof for continuously collecting sludge contained in said fuel oil, which means is supported coaxially with and rotatably within said vessel means so that said vessel means is partitioned into inlet and outlet chambers;
   an inlet conduit, connected to said inlet chamber, for supplying fuel oil to be reformed to said vessel means;
   an outlet conduit, connected to said outlet chamber, for delivering reformed fuel oil; and a means for generating ultrasonic waves provided with a device for irradiating said ultrasonic waves, the end of which device is positioned adjacent to said layered mesh structure mounted on said rotary collector so that said sludge collected on said layered mesh structure is dissociated into particles by means of said ultrasonic waves being irradiated from said device.

7. An apparatus for reforming fuel oil wherein ultrasonic waves are utilized and which comprises:
 a closed vessel means;
 a rotary collector means, forming a cylindrical shape and having a layered mesh structure of a fine mesh mounted on a cylindrical surface thereof for continuously collecting sludge contained in said fuel oil, which means is encircling an axis and is supported rotatably about said axis within said vessel means so that said vessel means is partitioned into inlet and outlet chambers;
 an inlet conduit, connected to said inlet chamber, for supplying fuel oil to be reformed to said vessel means;
 an outlet conduit, connected to said outlet chamber, for delivering reformed fuel oil; and
 a means for generating ultrasonic waves provided with a device for irradiating said ultrasonic waves, which device is arranged so that an elongated small gap extending in a direction perpendicular to that of the movement of said layered mesh structure is formed between the end of said device facing said layered mesh structure and the surface of said layered mesh structure, whereby said sludge collected on said layered mesh structure is dissociated into particles by means of said ultrasonic waves being irradiated from said device.

8. An apparatus for reforming fuel oil wherein ultrasonic waves are utilized and which comprises:
 a closed vessel means;
 a rotary collector means, having a cylindrical shape and a three-layered mesh structure mounted thereon for continuously collecting sludge contained in said fuel oil, which means is rotatably supported within said vessel means so that said vessel means is partitioned into an inlet chamber located outside of said collector means and an outlet chamber located inside of said collector means,
 said three-layered mesh structure comprising an outer layer durable against impact sound pressure, an intermediate layer of a layered mesh structure for collecting sludge contained in fuel oil, and an inner layer for supporting an external force exerted on said outer and intermediate layers;
 an inlet conduit, connected to said inlet chamber, for supplying fuel oil to be reformed to said vessel means;
 an outlet conduit, connected to said outlet chamber, for delivering reformed fuel oil; and
 a means for generating ultrasonic waves provided with a device for irradiating said ultrasonic waves, which device is disposed within said inlet chamber of said vessel, and the end of which device faces the surface of said layered mesh structure having a small gap therebetween, which surface faces said inlet chamber, whereby said sludge collected on said layered mesh structure is dissociated into particles by means of said ultrasonic waves being irradiated from said device.

9. An apparatus for reforming fuel oil according to any one of claims 6, 7 or 8, wherein the mesh size of said layered mesh structure is between 2 $\mu$m and 20 $\mu$m.

10. An apparatus for reforming fuel oil wherein ultrasonic waves are utilized and which comprises:
 an approximately cylindrical closed vessel means;
 a cylindrical rotary collector means, having a layer durable against impact sound pressure, a supporting layer, and a layered mesh structure of a mesh size between 2 $\mu$m and 20 $\mu$m sandwiched between said durable layer and said supporting layer for continuously collecting sludge contained in said fuel oil, which means is supported coaxially with and within said vessel means so that said vessel means is partitioned into inlet and outlet chambers;
 an inlet conduit, connected to said inlet chamber, for supplying fuel oil to be reformed to said chamber;
 an outlet conduit, connected to said outlet chamber, for delivering reformed fuel oil; and
 a means for generating ultrasonic waves provided with a device for irradiating said ultrasonic waves, the device being so arranged in said inlet chamber that an elongated small gap extending in a direction perpendicular to that of the movement of said layered mesh structure is formed between the end of said device facing said layered mesh structure and the surface of said layered mesh structure facing said inlet chamber, whereby said sludge collected on said layered mesh structure is dissociated by means of said ultrasonic waves being irradiated from said device.

11. An apparatus for reforming fuel oil wherein ultrasonic waves are utilized and which comprises a vessel and a rotary collector, composed of a three-layered mesh structure and rotatably disposed within said vessel in a liquid-tight manner, said apparatus being characterized in that an inlet for said fuel oil to be reformed and an outlet for the reformed oil are formed on the two chambers, respectively, which chambers are separated from each other by said rotary collector, and a horn disposed in a liquid-tight manner within one of said chambers on which said inlet is formed being so arranged that an ultrasonic dispersing zone is formed between the end of the horn and the outer layer mesh of said rotary collector, and said three-layered mesh structure comprises a first layer, facing the chamber on which said inlet is formed and being durable against impact sound pressure created by the irradiated ultrasonic waves, an intermediate layer, for collecting sludge contained in fuel oil, and a third layer, facing the chamber on which said outlet is formed and supporting an external force exerted on said first and intermediate layers.

* * * * *